United States Patent
Sakabe et al.

(10) Patent No.: US 9,057,856 B2
(45) Date of Patent: Jun. 16, 2015

(54) OPTICAL CABLE

(71) Applicant: SUMITOMO ELECTRIC INDUSTRIES, LTD., Osaka-shi, Osaka (JP)

(72) Inventors: Itaru Sakabe, Yokohama (JP); Yuya Homma, Yokohama (JP); Tomoyuki Hattori, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 14/058,777

(22) Filed: Oct. 21, 2013

(65) Prior Publication Data

US 2014/0119698 A1    May 1, 2014

(30) Foreign Application Priority Data

Oct. 24, 2012  (JP) .................................. 2012-235098

(51) Int. Cl.
*G02B 6/44*   (2006.01)

(52) U.S. Cl.
CPC .................................... *G02B 6/4403* (2013.01)

(58) Field of Classification Search
CPC .. G02B 6/443; G02B 6/02395; G02B 6/4403; G02B 6/4429; G02B 6/4433
USPC ............................. 385/100; 118/600; 65/430
See application file for complete search history.

(56) References Cited

U.S. PATENT DOCUMENTS

| | | | | |
|---|---|---|---|---|
| 5,524,164 | A * | 6/1996 | Hattori et al. ................. | 385/114 |
| 6,654,527 | B2 * | 11/2003 | Sakabe et al. ................. | 385/114 |
| 6,760,528 | B2 * | 7/2004 | Simomichi et al. ........... | 385/128 |
| 2003/0012536 | A1 * | 1/2003 | Simomichi et al. ........... | 385/128 |
| 2003/0081918 | A1 * | 5/2003 | Sakabe et al. ................. | 385/102 |
| 2010/0296780 | A1 * | 11/2010 | Schiaffo et al. ............... | 385/114 |
| 2013/0188916 | A1 * | 7/2013 | Bradley et al. ................ | 385/113 |

FOREIGN PATENT DOCUMENTS

| | | |
|---|---|---|
| JP | H10-115755 A | 5/1998 |
| JP | 2012-014101 A | 1/2012 |

OTHER PUBLICATIONS

Gardner, W.B. ATT: Microbending Loss in Optical Fibers, The Bell System Technical Journal, vol. 54, No. 2, 1975, available at http://lucent.com/bstj/vol54-1975/articles/bstj54-2-457.pdf.*
Jay, John, Corning: An Overview of Macrobending and Microbending of Optical Fibers, Dec. 2010, available at http://www.corning.com/assets/0/433/573/637/639/1bea48ac-d675-44c7-aa18-11a3a1a0adbd.pdf.*

* cited by examiner

*Primary Examiner* — Peter Radkowski
(74) *Attorney, Agent, or Firm* — Drinker Biddle & Reath LLP

(57) ABSTRACT

An optical cable comprises a coated optical fiber having an optical fiber which includes a core made of glass and a cladding surrounding the core and a jacket made of a thermoplastic resin. The jacket is directly covering the coated optical fiber while in close contact therewith. In the optical cable, the optical fiber has the highest modulus of elasticity in materials constituting the optical cable, a glass diameter of the optical fiber is at least 30 μm but not more than 200 μm while being 5% or less of a cable diameter of the optical cable, and a distortion occurring in the optical fiber when bending the optical cable by 180° is 6% or less.

10 Claims, 4 Drawing Sheets

Fig.3

| CONSTITUENT | EXAMPLE 1 | EXAMPLE 2 | EXAMPLE 3 | EXAMPLE 4 | EXAMPLE 5 | EXAMPLE 6 |
|---|---|---|---|---|---|---|
| GLASS DIAMETER ($\mu$m) | 80 | 100 | 30 | 200 | 80 | 80 |
| OPTICAL FIBER STRUCTURE | HPCF | GLASS | HPCF | HPCF | HPCF | HPCF |
| OPTICAL FIBER NA | 0.29 | 0.2 | 0.5 | 0.43 | 0.29 | 0.29 |
| NUMBER OF CORES | 4 | 4 | 12 | 1 | 4 | 4 |
| RIBBON FIBER | T | T | T | S(SINGLE FIBER) | T | T |
| JACKET MATERIAL | TPU | TPU | TPU | TPU | TPU | TPU |
| MODULUS OF ELASTICITY OF JACKET(MPa) | 100 | 100 | 50 | 100 | 200 | 100 |
| MODULUS OF ELASTICITY OF OPTICAL FIBER(GPa) | 70 | 70 | 70 | 70 | 70 | 70 |
| CABLE OUTER DIAMETER(mm) | 3 | 3 | 3 | 4 | 3 | 3 |
| GLASS DIAMETER/CABLE DIAMETER(%) | 2.7 | 3.3 | 1.0 | 5.0 | 2.7 | 2.7 |
| ES PRODUCT OF OPTICAL FIBER(N) | 1400 | 2200 | 600 | 2200 | 1400 | 1400 |
| ES PRODUCT OF JACKET(N) | 700 | 700 | 350 | 700 | 1400 | 700 |
| ES PRODUCT OF WHOLE CABLE(N)···E | 2100 | 2900 | 950 | 2900 | 2800 | 2100 |
| E × 6% | 126 | 174 | 57 | 174 | 168 | 126 |
| TENSILE BREAKING STRENGTH(N)···MEASURED VALUE | 120 | 170 | 50 | 170 | 120 | 120 |
| MAX CABLE FLEXURAL RIGIDITY(MPa)···A | 420 | 620 | 220 | 400 | 820 | 420 |
| MIN CABLE FLEXURAL RIGIDITY(MPa)···I | 400 | 400 | 200 | 400 | 800 | 400 |
| A/I | 1.05 | 1.55 | 1.10 | 1.00 | 1.03 | 1.05 |
| ADHESION FORCE BETWEEN FIBER AND JACKET(N) | 10 | 10 | 10 | 10 | 1 | 50 |
| PINCH BREAKAGE | NO | NO | NO | NO | NO | NO |
| LOW-TEMPERATURE LOSS INCREASE(-20°C)(dB/10m) | 0.4 | 0.3 | 0.1 | 0.1 | 0.4 | 0.4 |

Fig.4

| CONSTITUENT | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|
| GLASS DIAMETER ($\mu$m) | 125 | 80 | 80 | 80 | 25 |
| OPTICAL FIBER STRUCTURE | GLASS | HPCF | HPCF | HPCF | HPCF |
| OPTICAL FIBER NA | 0.2 | 0.29 | 0.29 | 0.29 | 0.5 |
| NUMBER OF CORES | 4 | 4 | 4 | 4 | 8 |
| RIBBON FIBER | T | T | T | T | T |
| JACKET MATERIAL | TPU | TPU | TPU | MDPE | TPU |
| MODULUS OF ELASTICITY OF JACKET(MPa) | 100 | 100 | 100 | 500 | 50 |
| MODULUS OF ELASTICITY OF OPTICAL FIBER(GPa) | 70 | 70 | 70 | 70 | 70 |
| CABLE OUTER DIAMETER(mm) | 2 | 3 | 3 | 3 | 3 |
| GLASS DIAMETER/CABLE DIAMETER(%) | 6.3 | 2.7 | 2.7 | 2.7 | 0.8 |
| ES PRODUCT OF OPTICAL FIBER(N) | 3400 | 1400 | 1400 | 1400 | 139 |
| ES PRODUCT OF JACKET(N) | 700 | 700 | 700 | 3500 | 350 |
| ES PRODUCT OF WHOLE CABLE(N)···E | 4100 | 2100 | 2100 | 4900 | 489 |
| E × 6% | 246 | 126 | 126 | 294 | 29.34 |
| TENSILE BREAKING STRENGTH(N)···MEASURED VALUE | 250 | 120 | 120 | 290 | ×(30) |
| MAX CABLE FLEXURAL RIGIDITY(MPa)···A | 690 | 420 | 420 | 2020 | 220 |
| MIN CABLE FLEXURAL RIGIDITY(MPa)···I | 400 | 400 | 400 | 2000 | 200 |
| A/I | 1.73 | 1.05 | 1.05 | 1.01 | 1.10 |
| ADHESION FORCE BETWEEN FIBER AND JACKET(N) | 10 | 0.5 | 100 | 50 | 10 |
| PINCH BREAKAGE | YES | NO | NO | NO | NO |
| LOW-TEMPERATURE LOSS INCREASE(-20°C)(dB/10m) | 0.1 | 0.4 | 0.4 | 5 | 1.2 |

OPTICAL CABLE

BACKGROUND OF THE INVENTION

1. Field of the Invention

The present invention relates to an optical cable and, in particular, to an optical cable of a tight structure in which a jacket is brought into close contact with a coated optical fiber without a tension member.

2. Related Background Art

For example, as disclosed in Japanese Patent Application Laid-Open No. 2012-014101, optical cables in which an optical fiber having a cladding made of a plastic is surrounded by a reinforcement material (such as an aramid fiber) whose periphery is covered with a jacket made of PVC, a fluorine resin (PTFE, ETFE, or PFA), a polyolefin resin (EVA), or the like have been used in the field of optical communications. An optical cable in which a ribbon fiber of optical fibers is covered with a hard resin coat in close contact therewith has also been known as disclosed in Japanese Patent Application Laid-Open No. H10-115755.

SUMMARY OF THE INVENTION

Inexpensive optical cables (optical cords) having appropriate mechanical characteristics have been in demand in the field of connecting among electric home appliances such as personal computers and TV where children and the like who have not used optical fibers before may handle optical cables.

In one aspect, the present invention relates to an optical cable. The optical cable comprises a coated optical fiber having an optical fiber which includes a core made of glass and a cladding surrounding the core and a jacket made of a thermoplastic resin, the jacket directly covering the coated optical fiber while in close contact therewith. In the optical cable, the optical fiber has the highest modulus of elasticity in materials constituting the optical cable, a glass diameter of the optical fiber being at least 30 μm but not more than 200 μm while being 5% or less of a cable diameter of the optical cable. A distortion occurring in the optical fiber when bending the optical cable by 180° is 6% or less.

BRIEF DESCRIPTION OF THE DRAWINGS

FIG. 3 is a chart listing structures and evaluation results of optical cables of examples; and FIG. 4 is a chart listing structures and evaluation results of optical cables of comparative examples.

DESCRIPTION OF THE PREFERRED EMBODIMENTS

Figure 1:
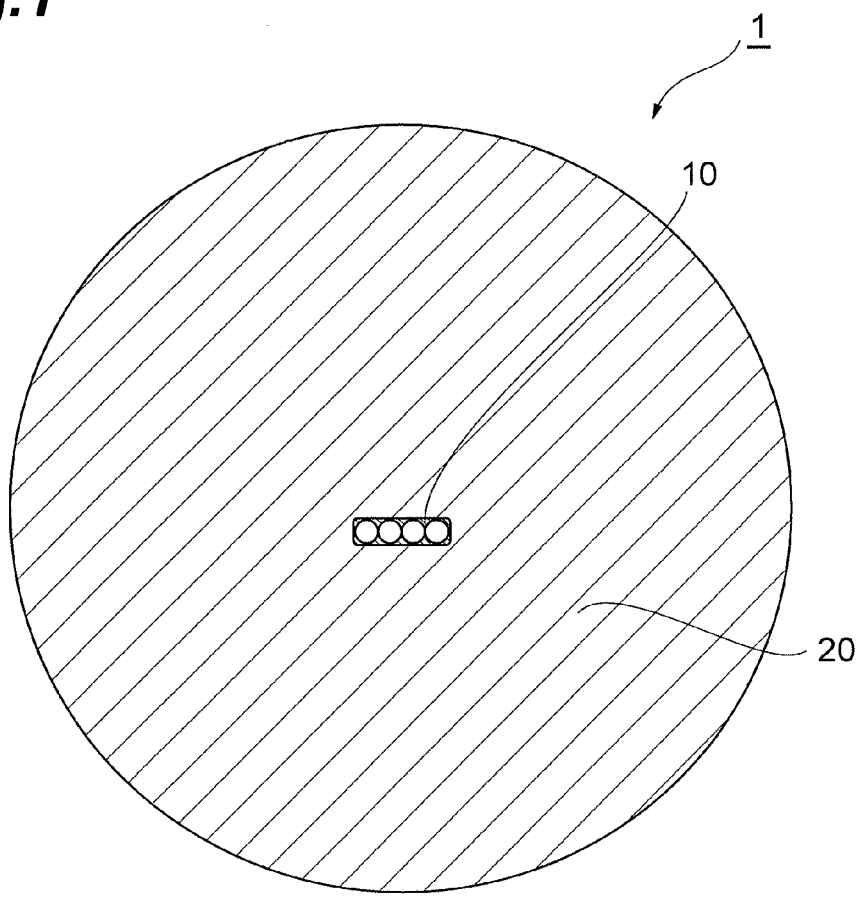
FIG. 1 is a sectional view illustrating the structure of the optical cable in accordance with an embodiment.

The optical cable in accordance with one aspect of the present invention comprises a coated optical fiber having an optical fiber which includes a core made of glass and a cladding surrounding the core and a jacket made of a thermoplastic resin, the jacket directly covering the coated optical fiber while in close contact therewith. In the optical cable, the optical fiber has the highest modulus of elasticity in materials constituting the optical cable, a glass diameter of the optical fiber being at least 30 μm but not more than 200 μm while being 5% or less of a cable diameter of the optical cable. A distortion occurring in the optical fiber when bending the optical cable by 180° is 6% or less.

In the optical cable, the jacket directly covers the coated optical fiber while in close contact therewith, the glass diameter of the optical fiber is at least 30 μm but not more than 200 μm while being 5% or less of the cable diameter of the optical cable, the optical fiber has the highest modulus of elasticity in the optical cable, and the distortion occurring in the optical fiber when bending the optical cable by 180° is 6% or less. Such a structure makes it possible to obtain an optical cable having a predetermined mechanical characteristic without a tension member. As a result, the optical fiber is restrained from breaking even when the optical cable is bent (pinched). The optical cable has a structure including no tension member and thus can be made as an inexpensive optical cable.

In the optical cable in accordance with one aspect of the present invention, 6% of an ES product of the optical cable represented by a product of Young's modulus E and cross-sectional area S of the optical cable may be 50 N or greater. The breaking strength of the optical cable corresponds to about 6% of the ES product of the whole cable. Therefore, the optical cable can secure a predetermined tensile strength when 6% of the ES product of the optical cable is 50 N or greater.

In the optical cable in accordance with one aspect of the present invention, an ES product of the optical fiber represented by a product of Young's modulus E and cross-sectional area S of the optical fiber may be not smaller than an ES product of the jacket represented by a product of Young's modulus E and cross-sectional area S of the jacket. This can restrain transmission loss from increasing at low temperature.

In the optical cable in accordance with one aspect of the present invention, the optical fiber may have a numerical aperture NA of 0.20 or greater, while a plurality of such optical fibers may be arranged on one plane. In this case, even in a ribbon fiber in which a plurality of optical fibers are arranged on one plane, the optical fibers are restrained from breaking.

In the optical cable in accordance with one aspect of the present invention, a value of flexural rigidity upon bending the optical cable along an arrangement direction of the plurality of optical fibers may be at least 1 time but less than 2 times a value of flexural rigidity upon bending the optical cable along a direction orthogonal to the arrangement direction. This can produce an optical cable which is easy to bend in any direction. When the plurality of optical fibers constitute a ribbon fiber, it is a prerequisite that the ribbon fiber should be attached to the jacket without twisting.

In the optical cable in accordance with one aspect of the present invention, the jacket may have a modulus of elasticity of 200 MPa or less. This can produce an optical cable having favorable flexibility.

In the optical cable in accordance with one aspect of the present invention, an adhesion force between the coated optical fiber and the jacket may be at least 1 N/cm but not more than 50 N/cm. This makes it easier to remove the jacket when processing terminals for attaching the optical cable to a connector, for example.

In the optical cable in accordance with one aspect of the present invention, the jacket may be transparent. The term "transparent" used herein means that a sheet processed into a thickness of 1 mm exhibits a transmittance of 70% or greater with respect to visible light (having a wavelength of 380 to 780 nm) according to JIS K7361-1.

In the following, preferred embodiments of the present invention will be explained in detail with reference to the accompanying drawings. In the explanation, the same constituents or those having the same functions will be referred to with the same signs while omitting their repeated descriptions.

First, with reference to FIGS. 1 and 2, an optical cable 1 in accordance with an embodiment will be explained.

FIG. 1 is a sectional view illustrating the structure of the optical cable 1 in accordance with the embodiment. This drawing represents a cross section perpendicular to the center axis direction of the optical cable 1. As this drawing illustrates, the optical cable 1 in accordance with the embodiment comprises a ribbon optical fiber 10 (coated optical fiber) and a jacket 20 directly covering the ribbon optical fiber 10. The optical cable 1 is an optical cable having a tight structure in which the jacket 20 is brought into close contact with the ribbon optical fiber 10 without a tension member.

Figure 2:
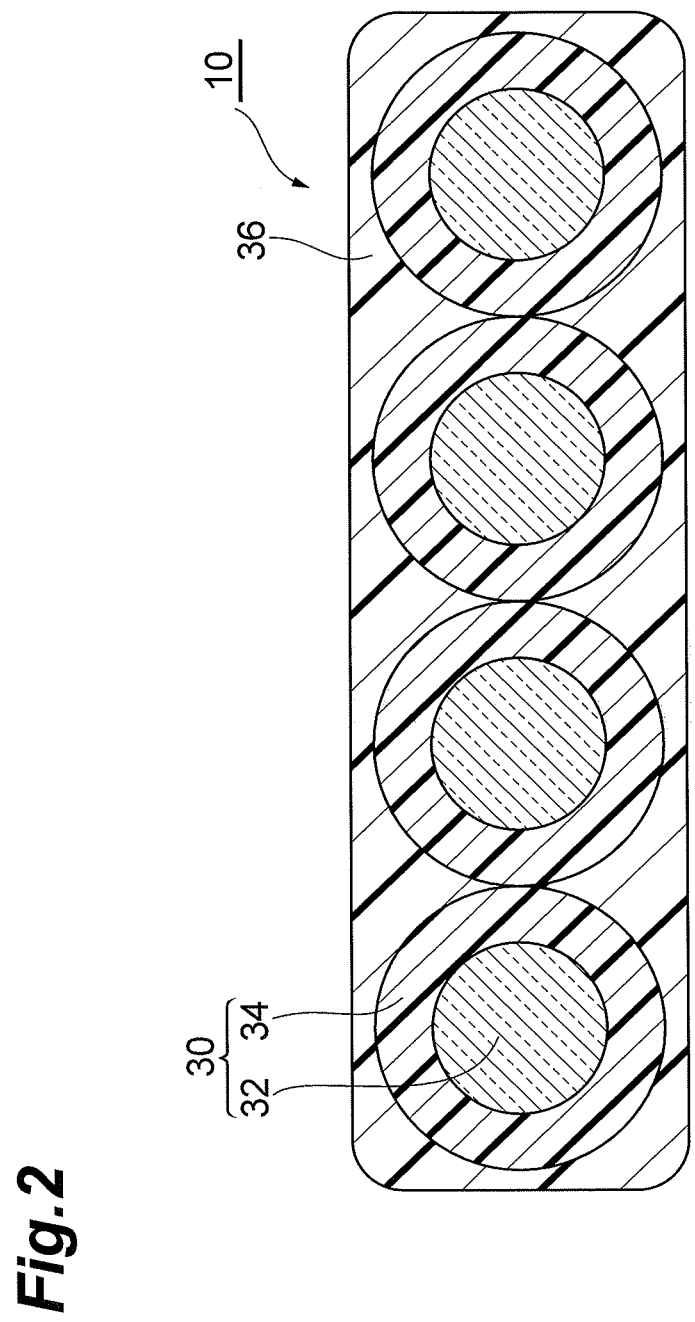
FIG. 2 is a diagram illustrating a cross-sectional structural example of a ribbon optical fiber.

As FIG. 2 illustrates, the ribbon optical fiber 10 is one in which a plurality of (even number in general, 4 in this embodiment) optical fibers 30 are arranged one-dimensionally in parallel and collectively covered with a tape-like coat 36, so as to be integrated. Preferably, the ribbon optical fiber 10 is arranged on or near the center axis of the optical cable 1.

Each of the optical fibers 30 constituting the ribbon optical fiber 10 has a core 32 and a cladding 34 surrounding the core 32.

The core 32 is a part for guiding light and has a refractive index higher than a reflective index of the cladding 34. The core 32 and cladding 34 may be constituted by glass, or the cladding 34 may be constituted by a plastic. An optical fiber in which both of the core 32 and cladding 34 are made of glass is referred to as AGF (All Glass Fiber), while an optical fiber in which the core 32 and cladding 34 are made of glass and a plastic, respectively, is referred to as HPCF (Hard Plastic Clad Fiber). The outer diameter of the cladding 34 constitutes a glass diameter when the optical fiber 30 is the AGF, while the outer diameter of the core 32 constitutes a glass diameter when the optical fiber 30 is the HPCF.

When the optical fiber 30 is the AGF, a primary layer, a secondary layer, and a color layer may be provided on the outer periphery of the cladding 34. These layers may be made of UV-curable resins based on urethane acrylate or urethane methacrylate, for example. A resin having a lower Young's modulus (e.g., several MPa) is used for the primary layer, while a resin having a higher Young's modulus (e.g., several hundred to a thousand and several hundred MPa) is used for the secondary layer.

When the optical fiber 30 is the HPCF, fluorine-containing UV-curable resins and the like may be used as a material for the cladding 34. The primary, secondary, and color layers may also be arranged on the outer periphery of the cladding 34 when the optical fiber 30 is the HPCF. The color layer may be arranged even when the primary and secondary layers are not provided.

As mentioned above, arranging the color layer on the outer periphery of the cladding 34 makes it easier to identify the optical fiber 30 to be processed when processing it at a terminal of the optical cable 1, thereby improving workability.

The optical cable 1 is often used around electric home appliances such as personal computers and TV and thus has a greater chance of being touched by people. Since the optical cable 1 may be bent extremely in such a case, it is desired for the optical fibers 30 to be kept from breaking for a long period of time even when the optical cable 1 is left bent in excess.

As a countermeasure, reducing the glass diameter of the optical fiber 30 is effective. From such a viewpoint, the diameter of the glass part (glass diameter) of the optical fiber 30 is at least 30 μm but not greater than 200 μm. By the same reason, the glass diameter of the optical fiber 30 is 5% or less of the cable diameter of the optical cable 1. When the AGF and HPCF are compared with each other, the HPCF can make the glass diameter smaller on condition that the core diameter is the same. That is, using the HPCF as the optical fiber 30 is more preferred in this embodiment.

Returning to FIG. 1, the jacket 20 is constructed substantially cylindrical so as to directly cover the ribbon optical fiber 10 while in close contact therewith. The jacket 20 is constituted by a thermoplastic resin, specific examples of which include thermoplastic polyurethane (TPU), polyvinyl chloride (PVC), fluorine resins (a preferable example of which is low-melting THV (terpolymer of tetrafluoroethylene, hexafluoropropylene, and vinylidene fluoride)), and silicone.

Thus, in the optical cable 1, the jacket 20 is arranged directly above the ribbon optical fiber 10 without reinforcements such as aramid. The optical cable 1 is constructed such that, in its constituent materials, the optical fiber 30 has the highest modulus of elasticity and functions as a tension member, thereby exhibiting a predetermined mechanical strength without tension members. Since the optical cable 1 is equipped with the structure mentioned above, the distortion occurring in the optical fibers 30 when the optical cable 1 is bent (pinched) by 180° is 6% or less. The foregoing restrains the optical fibers from breaking even when the optical cable 1 is bent (pinched). The optical cable 1 has a structure including no tension member and thus can be made as an inexpensive optical cable.

In the optical cable 1, as illustrated by examples which will be explained later, 6% of the ES product of the optical cable represented by the product of Young's modulus E and cross-sectional area S of the optical cable 1 is 50 N or greater. The breaking strength of the optical cable 1 corresponds to about 6% of the ES product of the whole cable. Therefore, the optical cable 1 can secure a predetermined tensile strength when 6% of its ES product is 50 N or greater.

In the optical cable 1, the ES product of the optical fibers represented by the product of Young's modulus E and cross-sectional area S of the optical fibers 30 is not smaller than the ES product of the jacket 20 represented by the product of Young's modulus E and cross-sectional area S of the jacket 20. This can restrain transmission loss from increasing at low temperature (−20° C.).

In the optical cable 1, the optical fiber 30 has a numerical aperture NA of 0.20 or greater, while a plurality of such optical fibers 30 are arranged on one plane. Therefore, even in the ribbon fiber in which a plurality of optical fibers 30 are arranged on one plane, the optical fibers are restrained from breaking.

In the optical cable 1, the value of flexural rigidity upon bending the optical cable 1 along the arrangement direction of a plurality of optical fibers 30 may be at least 1 time but less than 2 times the value of flexural rigidity upon bending the optical cable 1 along a direction orthogonal to the arrangement direction. Such a structure enables the optical cable 1 to become a ribbon fiber which is easy to bend in any direction. Here, it is a prerequisite that the ribbon should be attached to the jacket 20 without twisting.

In the optical cable 1, the jacket 20 has a modulus of elasticity of 200 MPa or less. This can produce an optical cable having favorable flexibility.

In the optical cable 1, the adhesion force between the ribbon optical fiber 10 and the jacket 20 is at least 0.2 N/cm but not more than 50 N/cm. This makes it easier to remove the jacket when processing terminals for attaching the optical cable 1 to a connector, for example.

The above-mentioned optical cable 1 can be made by preparing the ribbon optical fiber 10 by using a conventional manufacturing method and extruding a thermoplastic resin onto the ribbon optical fiber 10 so as to cover the ribbon optical fiber 10.

The optical cable in accordance with the present invention is not limited to the above-mentioned embodiment but can be modified in various ways. For instance, while the optical cable 1 in accordance with the above-mentioned embodiment illustrates an example using four optical fibers, the optical cable 1 may have a single optical fiber.

In the optical cable 1, the jacket 20 may be constructed so as to become transparent. The term "transparent" used herein means that a sheet processed into a thickness of 1 mm exhibits a transmittance of 70% or greater with respect to visible light (having a wavelength of 380 to 780 nm) according to JIS K7361-1. In this case, the optical cable becomes transparent and thus does not stand out much at the time of wiring and is excellent in appearance.

EXAMPLES

Examples using the optical cable 1 of the above-mentioned embodiment and comparative examples using optical cables having the same basic structure as that of the optical cable 1 but with different structural conditions will now be explained. FIG. 3 is a chart listing structures and evaluation results of the optical cables of the examples, while FIG. 4 is a chart listing structures and evaluation results of the optical cables of the comparative examples. Here, Example 4 is provided with a single optical fiber 30.

FIGS. 3 and 4 list the glass diameter (μm), optical fiber structure, optical fiber NA (numerical aperture), number of cores, ribbon fiber, jacket material, modulus of elasticity of the jacket (MPa), modulus of elasticity of the optical fiber (GPa), cable outer diameter (mm), glass diameter/cable diameter (%), ES product of the optical fiber (N), ES product of the jacket (N), ES product E of the whole cable (N), ES product E of the whole cable×6%, tensile breaking strength (N) (measured value), maximum cable flexural rigidity value A (MPa), minimum cable flexural rigidity value I (MPa), flexural rigidity ratio A/I, adhesion force between the fiber and jacket (N), whether pinch breakage exists or not, and low-temperature loss increase (−20° C.) (dB/10 m) for each of the examples and comparative examples.

In the row of the optical fiber structure, "HPCF" indicates an optical fiber whose core and cladding are made of glass and a plastic, respectively, while "GLASS" indicates the AGF, i.e., an optical fiber in which both of the core and cladding are made of glass. The number of cores indicates the number of optical fibers included. The ribbon fiber indicates whether the coated optical fiber is a ribbon optical fiber (represented by T in the charts) or a single coated fiber (represented by S in the charts) instead of the ribbon. The maximum cable flexural rigidity value A (MPa) is the flexural rigidity upon bending the cable along the arrangement direction of the ribbon, while the minimum cable flexural rigidity value I (MPa) is the flexural rigidity upon bending the cable perpendicular to the arrangement direction of the ribbon.

In each of the optical cables of Examples 1 to 5, as can be seen from the examples illustrated in FIG. 3, the optical fiber had the highest modulus of elasticity in the materials constituting the optical cable, the glass diameter fell within the range of 30 to 200 μm, the numerical aperture NA of the optical fiber was 0.2 or greater, the modulus of elasticity of the jacket was 200 MPa or less, the glass diameter/cable diameter was 5% or less, the tensile breaking strength (as well as 6% of the ES product of the whole optical cable) was 50 N or greater, the ES product of the optical fiber was not smaller than the ES product of the jacket, and the flexural rigidity ratio A/I was within the range of 1 to 2, preferably 1.6 or less.

Each of the optical cables of Examples 1 to 5 was substantially free of breakage upon pinching for 1 min (pinch breakage) and practically unproblematic and had the adhesion force between the fiber and jacket falling in a preferred range of 1 to 50 N and the low-temperature loss increase (the difference between the transmission loss in signals propagating through the optical cable placed for 2 hr at −20° C. and the transmission loss at 25° C.) falling in a preferred range of 1 dB/10 m or less. Here, the pinch means bending the optical cable by 180°.

By contrast, as can be seen from the comparative examples illustrated in FIG. 4, the pinch breakage occurred in Comparative Example 1 in which the glass diameter/cable diameter was greater than 5%. Since Comparative Examples 2 and 3 had the adhesion force between the fiber and jacket outside of the preferred range of 1 to 50 N, the unity between the jacket and fiber was so weak in Comparative Example 2 that the fiber failed to function as a tension member when the jacket was held at the cable terminal, whereby connectors fell out under a weak pulling tension of about 10 N, while the unity between the jacket and fiber was so strong in Comparative Example 3 that the jacket could not be removed. In Comparative Example 1, All which was the ratio of the maximum value to minimum value of the cable flexural rigidity exceeded 1.6, so that the optical fibers broke when pinching the cable depending on the cable bending direction, whereby its anisotropy was unfavorable.

In Comparative Example 4 in which the modulus of elasticity of the jacket was greater than 200 N delimiting the favorable range while the ES product of the optical fiber was smaller than the ES product of the jacket, the low-temperature loss increase (−20° C.) was as much as 5 dB/10 m. In Comparative Example 5 in which the ES product of the optical fiber was smaller than the ES product of the jacket, the low-temperature loss increase (−20° C.) was as much as 1.2 dB/10 m. Since the ES product of the whole cable (tensile breaking strength) was small, Comparative Example 5 broke at 30 N when subjecting it to a load of 50 N for 1 min in the tensile test.

What is claimed is:

1. An optical cable comprising:
   a coated optical fiber having an optical fiber which includes a core made of glass and a cladding surrounding the core; and
   a jacket made of a thermoplastic resin, the jacket directly covering the coated optical fiber while in close contact therewith;
   wherein the optical fiber has the highest modulus of elasticity in materials constituting the optical cable, a glass diameter of the optical fiber being at least 30 μm but not more than 200 μm while being 5% or less of a cable diameter of the optical cable; and
   wherein a distortion occurring in the optical fiber when bending the optical cable by 180° is 6% or less.

2. The optical cable according to claim 1, wherein 6% of an ES product of the optical cable represented by a product of Young's modulus E and cross-sectional area S of the optical cable is 50 N or greater.

3. The optical cable according to claim 1, wherein an ES product of the optical fiber represented by a product of Young's modulus E and cross-sectional area S of the optical fiber is not smaller than an ES product of the jacket represented by a product of Young's modulus E and cross-sectional area S of the jacket.

4. The optical cable according to claim 1, wherein the optical fiber has a numerical aperture NA of 0.20 or greater; a plurality of such optical fibers being arranged on one plane.

5. The optical cable according to claim 4, wherein a value of flexural rigidity upon bending the optical cable along an arrangement direction of the plurality of optical fibers is at least 1 time but less than 2 times a value of flexural rigidity upon bending the optical cable along a direction orthogonal to the arrangement direction.

6. The optical cable according to claim 1, wherein the jacket has a modulus of elasticity of 200 MPa or less.

7. The optical cable according to claim 1, wherein an adhesion force between the coated optical fiber and the jacket is at least 1 N/cm but not more than 50 N/cm.

8. The optical cable according to claim 1, wherein the jacket is transparent.

9. The optical cable according to claim 1, wherein the number of the optical fiber is one.

10. The optical cable according to claim 1, wherein the number of the optical fiber is more than one.

* * * * *